United States Patent Office

3,594,190
Patented July 20, 1971

3,594,190
RECOVERY OF ADHERING MEAT FROM BONES
Michael J. Eslinger, Weston, Ontario, John E. Dicks, Bolton, Ontario, and Henry R. Nordin, Maple, Ontario, Canada, assignors to Canada Packers Limited, Toronto, Ontario, Canada
No Drawing. Filed Oct. 20, 1967, Ser. No. 676,718
Int. Cl. A22c 11/00, 17/04
U.S. Cl. 99—109       8 Claims

ABSTRACT OF THE DISCLOSURE

This invention relates to a process for recovering adhering meat from raw bones which the major portion of the meat has already been removed. The process comprises tumbling the bones in a rotating drum in the presence of water or salt brine to abrade the meat from the bones by the combined action of the liquid and of the bones falling and rubbing repeatedly upon themselves to form a meat slurry, and then drawing off the slurry from the cleaned bones. The slurry is used directly in sausage manufacture where it imparts good binding power and adds food value.

BACKGROUND OF THE INVENTION (1) Field of the invention

In the normal course of packinghouse operations, a large quantity and variety of meat must be "boned-out." Thus, in order to produce a boneless ham, a butcher must first remove the bone from the hind leg of the hog. This is done with a simple knife, and when skillfully performed, only a relatively small amount of meat remains on the bone. In other cases, particularly when removing the backbones and neckbones of cattle and hogs, the bones contain substantial amounts of meat, since it is not feasible to follow the irregular surface of each vertebrae with a simple knife. These bones are often trimmed further using a motorized rotary knife, working on one bone at a time, which recovers additional valuable meat in the form of small trimmings, but the cost of labour makes this technique applicable only to bones containing relatively large quantities of meat, and more important, even after trimming in this manner, the trimmed bones still contain substantial amounts of valuable meat.

Thus, the meat packer seeks to leave as little meat as possible on the bones, since the latter are worth very little, whereas the meat, even in the form of small trimmings, is many times more valuable. The integrated meat packer is able to utilize meat trimmings in the preparation of many varieties of luncheon meats, bologna, and wieners, since, for this purpose, the various ingredients must be ground or comminuted in any case.

An important consideration is that the meat recovered from the bones be in a raw state, rather than cooked This is due to the fact that cooked meat possesses little or no "binding capacity," while raw meat possesses high "binding capacity." Binding capacity refers to the ability of the meat to form a stable mixture with added fat, water and salt, which is not broken down during the normal processing (cooking) operations in the manufacture of wieners, bologna, etc. Thus, raw meat is considerably more valuable to the packer for this purpose than is cooked meat.

(2) Description of the prior art

Some of the existing techniques for recovering meat from bones are as follows:

(1) *Enzymatic attack.*—The meat-containing bones are subjected to the action of proteolytic enzymes which loosen the meat-to-bone bond at elevated temperatures. See Can. 646,042 (to Swift and Co.), and U.S. 3,293,687 (to Swift and Co.). As discussed above, this method produces the meat in a cooked form.

(2) *Puffing gun.*—The bones are subjected to rather high steam pressures for a short time. Upon suddenly releasing this pressure, the meat is separated from the bone by the sudden liberation of the superheat. Again, the meat is in a cooked or partly cooked condition. See U.S. 3,129,455 (to General Mills).

(3) *Shot blasting.*—In U.S. 3,089,775 (to Unilever Ltd.), bones are shot-blasted with particles of ice or Dry Ice to remove the meat. The ice is then melted and drained off.

(4) *Mechanical methods.*—In this category are a variety of approaches in which the bones are subjected to some form of mechanical contact to remove the meat in a raw condition.

(a) Can. 711,844 (to Swift). Bones are conveyed past rotary brushes.

(b) Can. 743,694 (to Swift). Bones are flailed with rotating chains.

(c) Can. 573,876 (to Alex Lott). Bones are conveyed repeatedly past a second conveyor containing meat-removing knives.

(d) Can. 698,939 and U.S. 3,112,203 (to Swift). Water is added to crushed or comminuted bones, and the mass is violently agitated to free the meat from the bone particles and form a slurry containing both meat and bone. The mixture is centrifuged to remove the bone, and the further centrifuged to dewater the meat tissue. The water fraction contains dissolved protein, and may be spray dried in order to recover this valuable protein.

(e) U.S. 3,028,243 (to International Meat Processors). Similar in principle to (d) but the centrifugally separated meat product retains the added water, obviating the need to spray-dry.

(f) U.S. 2,895,162 (to Blue Channel Corp.). Meat is stripped from bones in passing through a hammer-mill-like apparatus with flat knife-type hammers and slotted discharge plate.

(g) U.S. 3,142,860 (to Gordon Johnson Co.). Meat is shredded from bones during passage through a platen having yieldable projections.

(h) U.S. 3,266,542, 3,266,543 and 3,256,555 (to S. A. Paoli). Meat is separated from bone particles during passage through a plurality of closely spaced cutting elements, or alternatively through opposed sets of cutting, scraping and tearing elements.

BRIEF SUMMARY OF THE INVENTION

The general object of the present invention is to avoid the complex procedures and apparatus of the prior art and to provide a simple, efficient and economical way of recovering the raw meat from bones in the form of a pumpable slurry usable directly in sausage emulsions.

According to the present invention, uncrushed raw bones of all types, i.e. beef, hog, sheep, or mixtures thereof, are simply tumbled for several hours in a closed container in the presence of water or salt brine until the bones are substantially clean and a meat slurry has been formed. The temperature can be room temperature or below. At the end of the tumbling operation, the slurry is drained off, strained, if necessary, to remove any small bones, and pumped or otherwise conveyed to the sausage making operation.

The proportion of liquid to bone is not sharply critical, but it is found that total recovery of protein values from the bone is best when the proportion is in approximately one to one ratio by weight. A ratio of about 0.5 to 2.0 parts of water or brine to one part of bones, by weight, is quite satisfactory, with the one to one ratio, however, being preferred for most bones encountered in the normal packinghouse operation.

While satisfactory operation can be realized by using water, it is preferred to use salt brine. The purpose of the salt is two-fold. It assists in maintaining lower levels of bacterial growth than would be the case with water alone as the vehicle, and it increases the viscosity of the meat slurry by swelling the protein fibres, so that the components of the mixture do not separate upon standing prior to use. An NaCl concentration in the range of about 1 to 15% can be used, but in general there is little, if any, advantage in using greater salt concentration than about 5%. The salt in the slurry product replaces an equivalent amount of salt in the sausage mix to which the slurry is added.

The meat slurry is used as an ingredient in the manufacture of wieners, bologna, and luncheon meats. It might at first be thought that the high moisture content of the material is disadvantageous; however, this is not the case, since the formulations of these products normally require the addition of substantial amounts of water, which can be supplied directly by the meat slurry.

Tests have shown that in all respects, when allowance is made for the moisture content, the meat slurry is equivalent to raw meat. This has been confirmed by amino acid analyses.

DETAILED DESCRIPTION OF INVENTION

A typical operation is as follows:

The meat-containing bones are placed into a rotary drum fitted with internal baffles. The drum rotates on a horizontal axis. One example of suitable apparatus is a standard "No. 6 De Laval butter churn," the drum being 5½ ft. in diameter by approximately 8 ft. long, and rotating at 11 r.p.m. This churn is equipped with a large water-tight door, through which the bones may be loaded and subsequently discharged after the adhering meat has been recovered, and a 2" discharge valve. The apparatus is installed in a cold area to minimize bacterial growth.

The drum described above is loaded with approximately 3,500 lbs. of bones of any type, and an equal weight of cold water is added through a water meter. For every 100 lbs. of water added, 5 lbs. of common salt is also added. The charging door is closed and the churn is allowed to rotate for 2–3 hours. During this time, the tumbling action of the bones, falling and rubbing repeatedly upon themselves, coupled with the presence of the brine solution, tends to abrade off most of the meat adhering to the bones. A portion of the meat protein thus removed is dissolved in the brine solution, while the bulk is present as fibrous, stringy, native meat. As will be seen, the fact that some of the protein is dissolved is in no way disadvantageous, since no separation is required or attempted.

After the end of the tumbling period, the churn is stopped and the 2" discharge valve is opened. The recovered meat, in the form of a thick slurry, drains by gravity out of the churn, leaving the cleaned bones behind. The cleaned bones may be given an additional rinse with water after the bulk of the meat slurry has drained out, and this is mixed with the bulk of the meat slurry.

Normally, about 1.2 lbs. of meat slurry is recovered per pound of bones loaded to the churn. A typical analysis, from a mixture of pork bones, is:

|  | Percent |
|---|---|
| Moisture | 86 |
| Fat | 7 |
| Protein | 3.5 |
| Salt | 3.0 |

We estimate that the meat slurry is of such a composition that 100 lbs. is approximately equivalent to 20 lbs. of lean meat.

Small amounts of clean bone sometimes discharge from the churn along with the meat slurry due to the size of the drainage valve. These are readily removed from the meat slurry by means of any simple straining device through which the slurry can be pumped while the bones are held back. The small amount of bone in the slurry from the drum poses no problem such as encountered when bones are crushed or ground.

The following illustrate some examples of practice of this invention.

EXAMPLE 1

Effect of brine concentration on yield of meat from bones

A specially constructed laboratory-size rotary drum was employed for this investigation. This apparatus consists of a 16" diameter stainless steel drum rotating at 15 r.p.m. on a horizontal axis, the drum being divided vertically into four water-tight compartments, each 8" wide, so that the over-all width of the drum (four compartments) is 32". Each compartment is fitted with four internal baffles to assist in tumbling the contents, and each compartment is fitted with a water-tight handhole. For draining off the fluid product, the solid plate covering the handhole is replaced with a mesh plate.

Ten pounds of pork backbones were placed into each of the four compartments, after breaking each backbone into three pieces, and an equal weight of cold water was added. Common salt was then added to give various concentrations, and the drum was rotated for 5 hours at 45° F. The fluid product containing the abraded and dissolved meat from the bones was drained off from each compartment through the mesh plate, and the residual bones were rinsed with a small quantity of water. The rinse water was added to the product.

TABLE I.—EFFECT OF BRINE CONCENTRATION ON YIELD OF MEAT FROM BONES
[Laboratory-size rotary drum]

| Lb. backbones | Percent salt in brine | Lb. product recovered | Product analysis (percent) | | | | | Lb. protein in product per lb. backbone |
|---|---|---|---|---|---|---|---|---|
| | | | Moisture | Fat | Protein | Salt | Calcium | |
| 10 | 0 | 9.84 | 92.8 | 3.5 | 3.48 | .05 | .07 | .034 |
| 10 | 5 | 10.19 | 86.1 | 6.9 | 4.06 | 2.9 | .04 | .041 |
| 10 | 10 | 10.13 | 84.5 | 5.8 | 4.28 | 5.1 | .08 | .043 |
| 10 | 15 | 12.05 | 80.1 | 7.4 | 3.52 | 7.7 | .05 | .042 |

EXAMPLE 2

Table I indicates that the recovery of meat from bones is improved when brine is used as the extraction medium, rather than water. This is verified in the following large scale tests using a "De Laval No. 6 butter churn" rotating at 11 r.p.m. for 2 hours at 40° F., comparing a water extraction with a 5% salt extraction. These tests involved 2,000–3,500 lbs. of mixtures of pork backbones, neckbones, and blade bones in each test.

TABLE II.—EFFECT OF BRINE CONCENTRATION ON YIELD OF MEAT FROM BONES
[De Laval No. 6 butter churn]
(A) Water extraction

| Lb. product per lb. bones | Product analysis (percent) | | | | Lb. protein in product per lb. bones |
|---|---|---|---|---|---|
| | Moisture | Fat | Protein | Salt | |
| 1.04 | 89.6 | 6.3 | 3.4 | (¹) | 0.035 |
| 1.10 | 89.2 | 7.0 | 3.16 | (¹) | 0.035 |
| (B) 5% salt extraction | | | | | |
| 1.04 | 85.5 | 7.0 | 4.3 | 3.3 | 0.045 |
| 1.10 | 86.0 | 6.5 | 4.1 | 3.0 | 0.045 |

¹ Nil.

Tables I and II show that the use of a salt solution of modest concentration results in a superior recovery of meat from the bones. Thus, the mechanism of complete meat recovery entails more than mere physical abrasion, and appears to include a selective solubility of the salt-soluble proteins of the meat.

In addition, the use of salt in modest concentrations is desirable since it causes the meat proteins to swell and become viscous, thereby conferring stability upon standing. The product recovered from the bones using a salt extraction does not settle out or separate into layers, even on prolonged standing, whereas the product extracted with water will readily separate into layers. It is also well-known that the presence of salt in such a meat product tends to inhibit bacterial growth, which is advantageous.

Thus, without wishing to limit this invention exclusively to the use of salt, its use is preferred over the use of pure water.

EXAMPLE 3

Optimum brine-to-bone ratio

The ratio of 5% brine to bones was varied in the following tests, conducted in the De Laval butter churn.

TABLE III.—OPTIMUM BRINE-TO-BONE RATIO

| Lb. 5% brine per lb. bone | Percent protein in product | Lb. protein in product per lb. bone |
|---|---|---|
| 2.0 | 2.25 | .041 |
| 1.0 | 3.75 | .045 |
| 0.5 | 4.50 | .026 |

Table III shows that with a high ratio of brine to bone (2.0:1) the protein content of the product is relatively low, which is disadvantageous. On the other hand, with a low ratio (0.5:1) the protein recovery from the bones is substantially lowered. Therefore, a 1:1 ratio is preferred.

EXAMPLE 4

Optimum time of extraction

Using a De Laval No. 6 butter churn operating at 11 r.p.m., and loaded with 2,000–3,800 lbs. of a mixture of pork bones, it has been found that a period of rotation of between two and three hours is sufficient to abrade and dissolve the bulk the meat from the bones. Shorter periods result in decreased yields, and longer periods, while not harmful, result in little additional yield.

It should be realized that the above examples are by way of illustration only. We do not wish to limit this invention to the use of any particular apparatus. It is to be understood that rotary drums of differing dimensions, having more or fewer baffles, and operating at other speeds and with other weights of bones, etc. may extract the meat from the bones at other rates.

The amino acid composition of the meat product recovered from a mixture of pork backbones, blade bones, and neckbones using a 5% salt solution was compared to the composition of skeletal muscle protein and also to collagen. It was found that the analysis of the recovered protein from the bones corresponded quite closely to that of the muscle protein. It does not have the typical amino acid concentrations that characterize collagen.

EXAMPLE 5

Pork bones

The following mixture of pork bones was loaded to the De Laval No. 6 butter churn:

| | Lbs. |
|---|---|
| Neckbones | 1,015 |
| Sow backbones | 890 |
| Hog backbones | 948 |
| Blade bones | 440 |
| | 3,293 |

The neckbones and sow backbones had first been trimmed of as much meat as commercially feasible, using a motorized rotary knife. 330 Imperial gallons of cold water were metered into the churn, and 165 lbs. of fine common salt was added.

The churn was closed and rotated for 3 hours at 11 r.p.m. The fluid product was then allowed to drain out from a 2" discharge valve, in the form of a thick slurry. A minor amount of bone escaped through the discharge valve along with the product, which was removed from the product by passing the slurry through the holes of a perforated plate, while the oversize pieces of bone were rejected and held back in the body of the apparatus for later disposal. One quarter inch holes in the plate have been found to be satisfactory.

When the bulk of the meat product was drained from the churn, 60 gallons of additional water were added, and the churn was rotated briefly. This rinse water was then drained into the main bulk of the product, again using the bone separator.

Final product: 3,290 lbs.
  83.9% moisture
  7.4% fat
  3.55% protein
  3.2% salt
  0.09% calcium In this example, the recovery was calculated to be 0.042 lb. protein per lb. of bones. Since lean meat contains approximately 20% protein, this recovery is approximately equivalent to 0.21 lb. of lean meat per pound of bones.

EXAMPLE 6

Beef bones 1,597 lbs. of beef bones, including all carcass bones except the femurs and shanks were loaded to the churn with 160 gallons of water and 80 lbs. of salt. These bones were not trimmed after being boned out. The churn was rotated for 2 hours, and after draining the bulk of the product, the spent bones were rinsed with 20 gallons of water.

Final product: 1,560 lbs.
  85.5% moisture
  6.7% fat
  3.5% protein
  3.6% salt
  0.08% calcium The recovery was calculated to be 0.034 lb. protein per lb. bone, or approximately 0.17 lb. lean meat per pound of bone.

EXAMPLE 7

The utilization of recovered meat 20 lbs. of a slurry product as produced by the present invention and containing 17.4 lbs. of water, 0.7 lb. of protein, 1.2 lbs. of fat and 0.6 lb. of salt were substituted for 20 lbs. of the equivalent constituents in 100 lbs. of a standard sausage emulsion. The final product was similar in all respects, both organoleptically and physically, to the product produced with the standard formulation.

The protein of the meat (i.e. muscle) is the most important constituent in comminuted sausage products. It is the principal structural component which binds fat and moisture. In order to perform this role effectively it is essential that as much of the protein as possible be in solution. This occurs to some degree during the chopping and mixing stages in normal sausage emulsion production. Because of the prolonged treatment with cold brine, the meat recovered from bones by the present process is in an ideal state for incorporation in sausage emulsions, and it thus has a higher-than-normal binding value.

REVIEW OF ADVANTAGES OF INVENTION

The process of the invention includes the following advantages and desirable features:

(1) The meat is recovered in a raw condition.

(2) Uncrushed bones of all types, or mixtures of different types of bone may be processed.

(3) The equipment cost is modest, since no crushers, disintegrators, or centrifuges are involved.

(4) Labor requirements are low. One operator can tend several rotary drums, each of which can be as large as desired.

(5) The equipment is particularly suited for sanitary operation, consisting essentially of an empty vessel, rotated by exterior means.

(6) Since the product is produced in a fluid condition, it is readily delivered to its destination by a pump and pipeline, saving additional labor.

It will be seen that the process differs markedly from any of the known processes insofar as (a) the principle of removal of the meat from the bone involves scouring the whole bones upon themselves, and (b) the process produces the meat as a fluid product with no attempt at concentration or separation.

It is to be understood that various modifications will readily become apparent to those skilled in the art upon reading the foregoing description of the invention. All such modifications are intended to be included within the scope of the invention as defined in the appended claims.

We claim:

1. A process for removing residual meat from whole raw bones from beef, hog or sheep from which the major portion of the meat has already been removed, comprising: tumbling said bones in a rotating water-tight container in the presence of an aqueous liquid below that temperature at which the meat is cooked to abrade the meat from the bones by the combined action of the liquid and of the bones falling and rubbing repeatedly upon themselves to form a raw meat slurry and drawing off the said raw meat slurry from the cleaned bones.

2. The process of claim 1 wherein the aqueous liquid is water.

3. The process of claim 1 wherein the aqueous liquid is salt brine.

4. The process of claim 3 wherein the salt brine has an NaCl concentration of about 1 to 15%.

5. The process of claim 4 wherein the salt brine has an NaCl concentration of about 5%.

6. The process of claim 3 wherein the salt brine is present during the tumbling operation in a brine-to-bone ratio of about 0.5 to 2.0 parts by weight per part of bone.

7. The process of claim 6 wherein the brine-to-bone ratio is about 1 to 1 on a parts-by-weight basis.

8. A process for utilization of whole raw bones from beef, hog or sheep from which the major portion of the usable meat has been removed, comprising: tumbling said bones in the presence of salt brine below that temperature at which the meat is cooked to abrade the meat from the bones by the combined action of the brine and of the bones falling and rubbing upon themselves to provide a brine slurry of raw meat having good binding capacity and having a protein analysis between about 2 and 5%, separating said slurry from the cleaned bones and incorporating said raw meat slurry into a sausage mix to supply binding power and protein value.

References Cited

UNITED STATES PATENTS 3,028,243   4/1962   Robertson et al. _____ 99—107
3,098,014   7/1963   Denton et al. _____ 99—107

A. LOUIS MONACELL, Primary Examiner

J. R. HOFFMAN, Assistant Examiner

U.S. Cl. X.R.

17—46; 99—108